(12) United States Patent
Cheng et al.

(10) Patent No.: US 11,025,742 B2
(45) Date of Patent: Jun. 1, 2021

(54) DYNAMIC LINK PROCESSING ENGINE

(71) Applicants: Atlassian PTY Ltd., Sydney (AU); Atlassian Inc., San Francisco, CA (US)

(72) Inventors: Jerry Cheng, Mountain View, CA (US); Shuai Li, Sunnyvale, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 49 days.

(21) Appl. No.: 16/369,949

(22) Filed: Mar. 29, 2019

(65) Prior Publication Data

US 2020/0314205 A1    Oct. 1, 2020

(51) Int. Cl.
| | | |
|---|---|---|
| *G06F 15/16* | (2006.01) | |
| *H04L 29/08* | (2006.01) | |
| *G06F 16/955* | (2019.01) | |
| *G06F 40/134* | (2020.01) | |
| *G06F 9/451* | (2018.01) | |

(52) U.S. Cl.
CPC .............. *H04L 67/32* (2013.01); *G06F 9/451* (2018.02); *G06F 16/9566* (2019.01); *G06F 40/134* (2020.01); *H04L 67/02* (2013.01)

(58) Field of Classification Search
CPC ......... H04L 67/32; H04L 67/02; H04L 67/18; G06F 9/451; G06F 40/134; G06F 16/9566; G06Q 10/10
USPC .......................................... 709/238; 715/205
See application file for complete search history.

(56) References Cited

U.S. PATENT DOCUMENTS

| | | | | |
|---|---|---|---|---|
| 9,280,338 | B1* | 3/2016 | Stickle | G06F 8/65 |
| 9,626,158 | B1* | 4/2017 | Ben-Tzur | G06F 8/24 |
| 10,135,808 | B1* | 11/2018 | Wasiq | H04L 63/102 |
| 2008/0040653 | A1* | 2/2008 | Levine | G06Q 30/02 |
| | | | | 715/205 |
| 2009/0234730 | A1* | 9/2009 | Lee | G06Q 30/0277 |
| | | | | 705/14.73 |
| 2014/0207911 | A1* | 7/2014 | Kosmach | H04L 65/1083 |
| | | | | 709/218 |
| 2018/0335921 | A1* | 11/2018 | Karunamuni | G06F 3/0485 |
| 2019/0109798 | A1* | 4/2019 | Specter | H04L 65/604 |

* cited by examiner

*Primary Examiner* — David R Lazaro
*Assistant Examiner* — Mariegeorges A Henry
(74) *Attorney, Agent, or Firm* — Alston & Bird LLP

(57) ABSTRACT

Method, apparatus and computer program product for dynamic link processing engine. For example, the apparatus includes at least one processor and at least one non-transitory memory including program code. The at least one non-transitory memory and the program code are configured to, with the at least one processor, determine link invocation information associated with a link invocation; determining, based on the link invocation information, a link display characterization for the link invocation; and in response to determining that the link display characterization indicates that the expected output associated with the link invocation comprises display-oriented data: determine, based on the link invocation information, a dynamic redirection characterization for the link invocation; and in response to determining that the dynamic redirection characterization indicates that the display-oriented data associated with the link invocation is associated with the target application, perform an inter-application redirection between the invoking application and the target application.

19 Claims, 9 Drawing Sheets

DYNAMIC LINK PROCESSING ENGINE

BACKGROUND

Applicant has identified many deficiencies and problems associated with existing methods, apparatus, and systems related to link processing. Through applied effort, ingenuity, and innovation, many of these identified deficiencies and problems have been solved by developing solutions that are in accordance with embodiments of the present disclosure, many examples of which are described in detail in this document.

BRIEF SUMMARY

In general, embodiments of the present invention provide methods, apparatus, systems, devices, and/or the like for dynamic link processing. For example, various embodiments of the present invention provides techniques for dynamic link processing through using at least one of dynamic display characterization and dynamic link redirection.

In accordance with one aspect, an apparatus is provided. The apparatus comprises at least one processor and at least one non-transitory memory comprising program code. The at least one non-transitory memory and the program code are configured to, with the at least one processor, cause the apparatus to at least determine link invocation information associated with the link invocation; determine, based on the link invocation information, a link display characterization for the link invocation, wherein the link display characterization for the link invocation indicates if an expected output associated with the link invocation comprises display-oriented data; and in response to determining that the link display characterization indicates that the expected output associated with the link invocation comprises the display-oriented data: determine, based on the link invocation information, a dynamic redirection characterization for the link invocation, wherein the dynamic redirection characterization for the link invocation indicates if the display-oriented data associated with the link invocation is associated with a target application of the one or more client software applications; and in response to determining that the dynamic redirection characterization indicates that the display-oriented data associated with the link invocation is associated with the target application, perform an inter-application redirection between the invoking application and the target application.

In some embodiments, the link invocation information associated with the link invocation comprises an invoked application identifier associated with an invoked application for the link invocation; and determining the dynamic redirection characterization for the link invocation comprises receiving a local presence status for the invoked application and determining the dynamic redirection characterization based on the local presence status.

In some embodiments, receiving the local presence status for the invoked application comprises retrieving dynamic redirection data stored in an inter-application shared storage medium; the one or more software applications are configured to write local presence data for the software application to the inter-application shared storage medium; and the dynamic redirection data includes the local presence data for each software application of the one or more software applications.

In some embodiments, determining the local presence status for the invoked application comprises retrieving local presence data for the one or more software applications from an operating system software application associated with the computing device. In some embodiments, determining the local presence status for the invoked application comprises determining a present local presence status in response to determining the invoked application is one of the one or more software applications. In some embodiments, determining the local presence status for the invoked application comprises determining a present local presence status in response to determining a latest version of the invoked application is one of the one or more software applications. In some embodiments, determining the dynamic redirection characterization based on the local presence status comprises determining that the display-oriented data associated with the link invocation is associated with the target application in response to determining that the local presence status indicates a present local presence status.

In some embodiments, the link invocation information associated with the link invocation comprises a target address for the link invocation; and determining the link display characterization comprises determining if the target address comprises the display-oriented data. In some embodiments, wherein the display-oriented data comprises hyper-text markup language (HTML) data. In some embodiments, the link invocation information associated with the link invocation comprise display configuration data for the link invocation, wherein the display configuration data indicate the link display characterization of the link invocation irrespective of a target address of the link invocation; and determining the link display characterization comprises determining the dynamic display characterization of the link invocation based on the display configuration data.

In some embodiments, the at least one non-transitory memory and the program code are configured to, with the at least one processor, cause the apparatus to augment a Hyper-text Transfer Protocol (HTTP) packet header associated with the link invocation to comprise at least a portion of the display configuration data for the link invocation. In some embodiments, the at least one non-transitory memory and the program code are configured to, with the at least one processor, cause the apparatus to, in response to determining that the dynamic redirection characterization indicates that the display-oriented data associated with the link invocation is not associated with the target application, perform an inner-application rendering of the target application within an in-app browser associated with the invoking application. In some embodiments, the link invocation information associated with the link invocation comprise a link invocation intensity; and determining the link display characterization comprises determining that the link redirection characterization indicates that the expected output associated with the link invocation does not comprise the display-oriented data in response to determining that the link invocation intensity fails to satisfy an intensity threshold.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
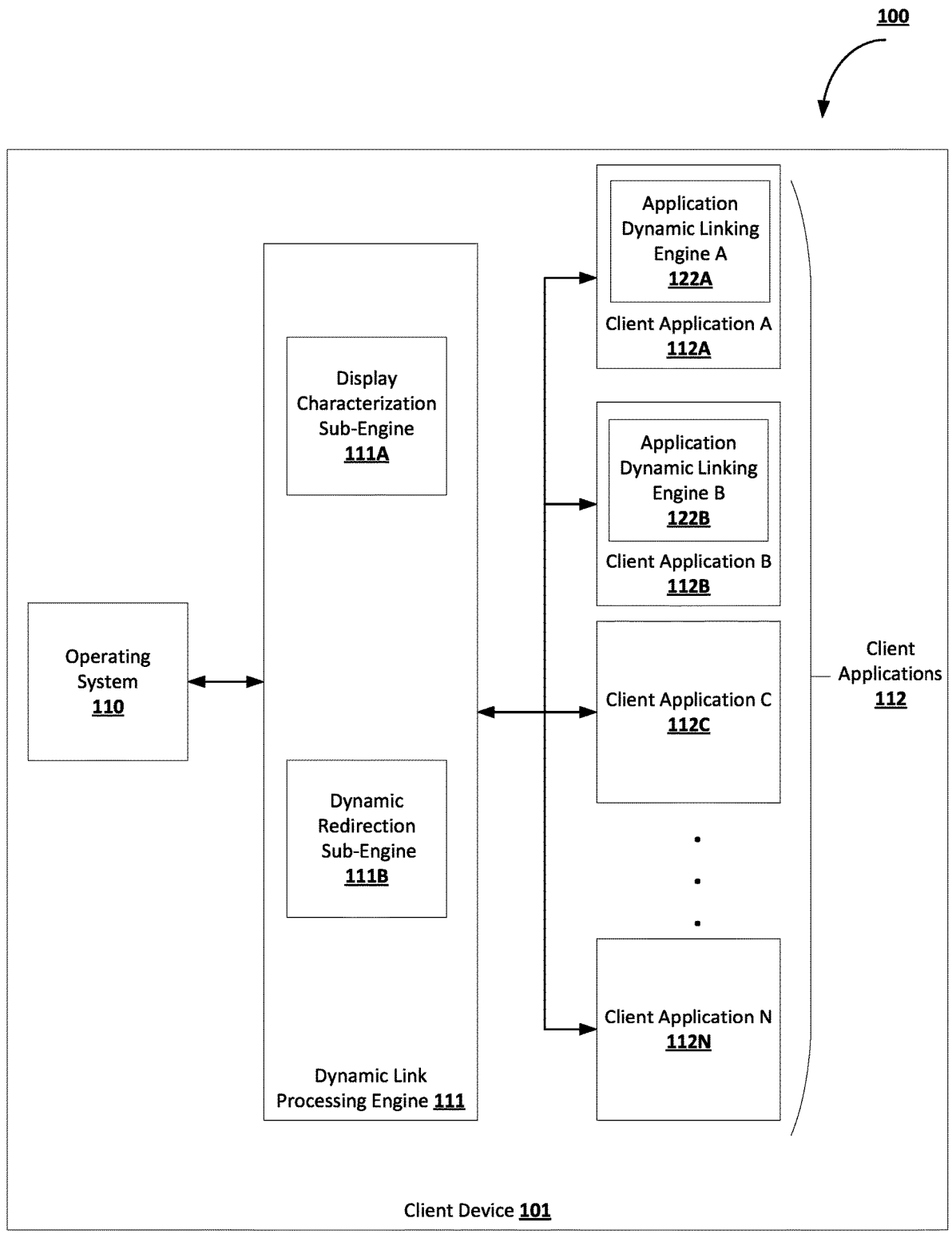

Having thus described some embodiments in general terms, references will now be made to the accompanying drawings, which are not necessarily drawn to scale, and wherein:

FIG. 1 is an example system architecture within which embodiments of the present invention may operate.

Figure 2:
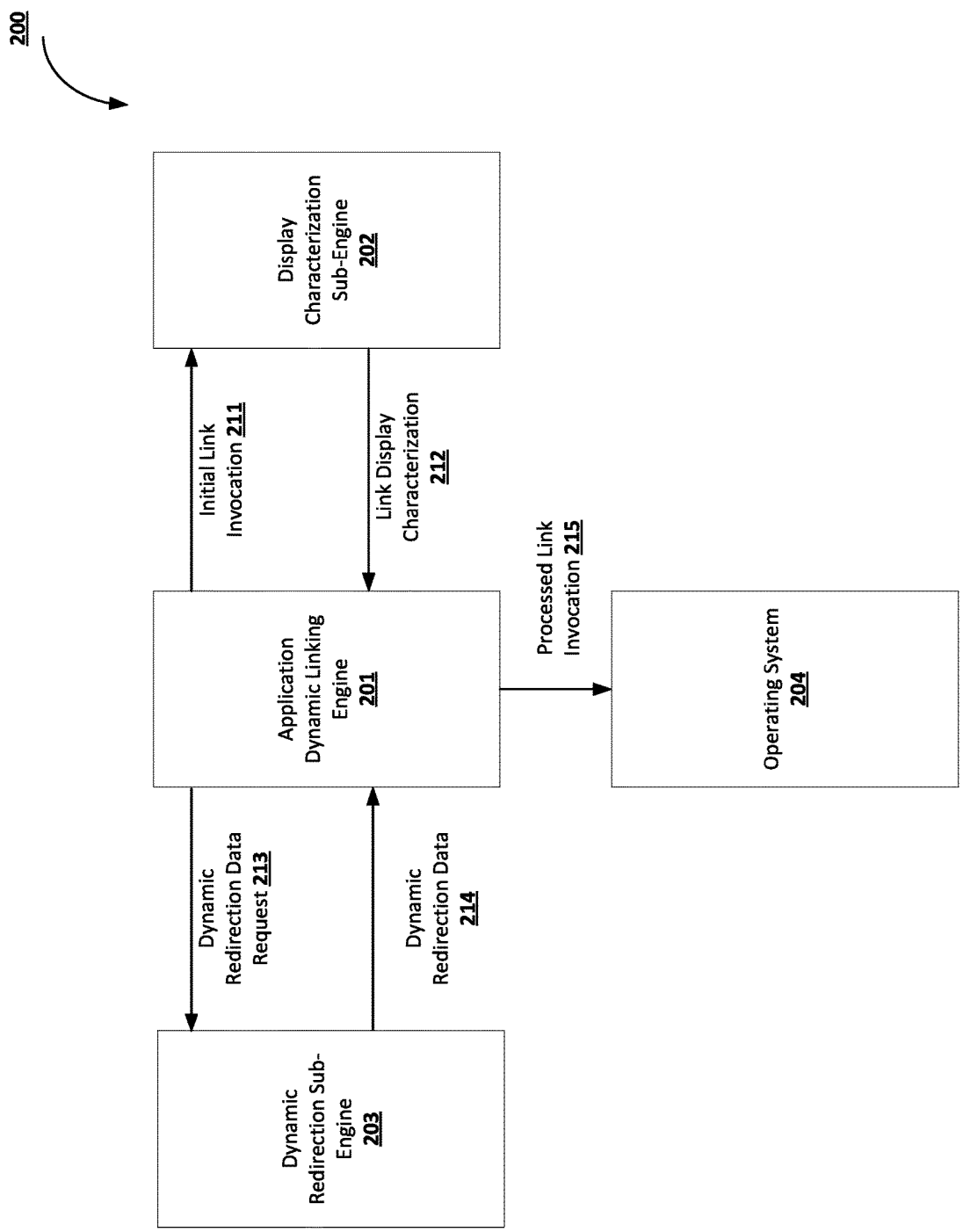

FIG. 2 is a data flow diagram for an example process for dynamic link processing in accordance with one embodiment of the present invention.

Figure 3:
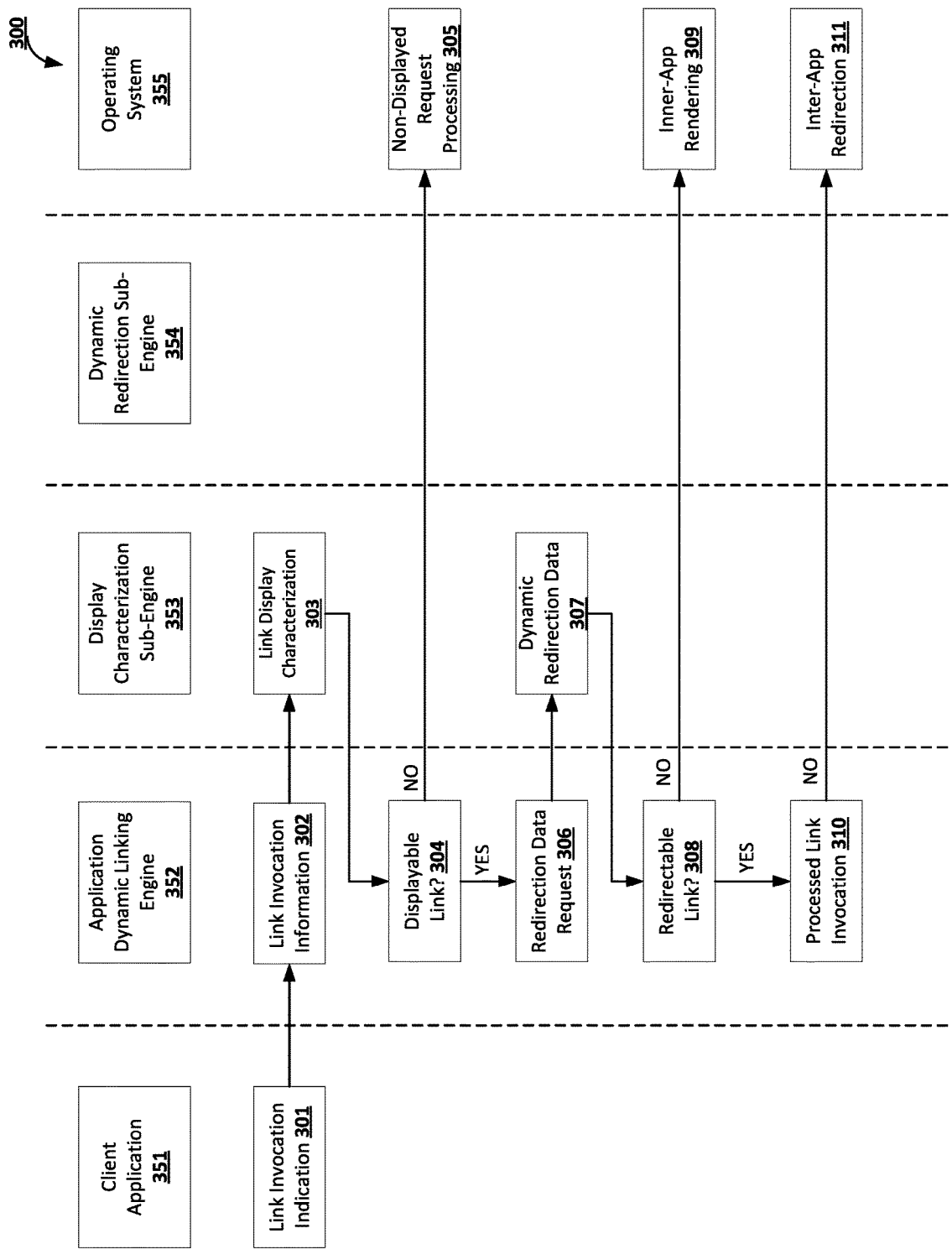

FIG. 3 is a distributed flowchart diagram of an example process for link processing in accordance with one embodiment of the present invention.

Figure 4:
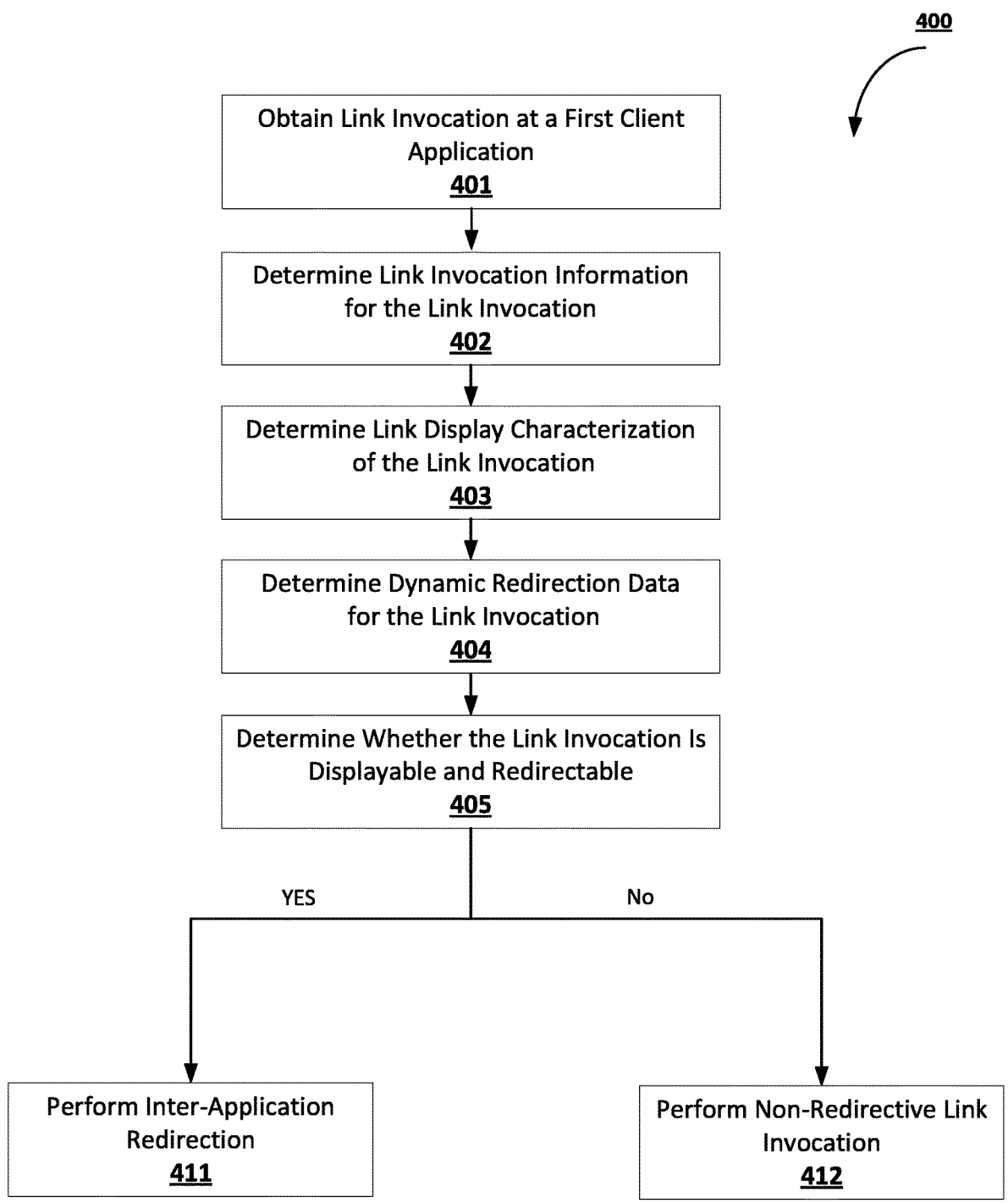

FIG. 4 is a flowchart diagram of an example process for dynamic link processing in accordance with one embodiment of the present invention.

Figure 5:
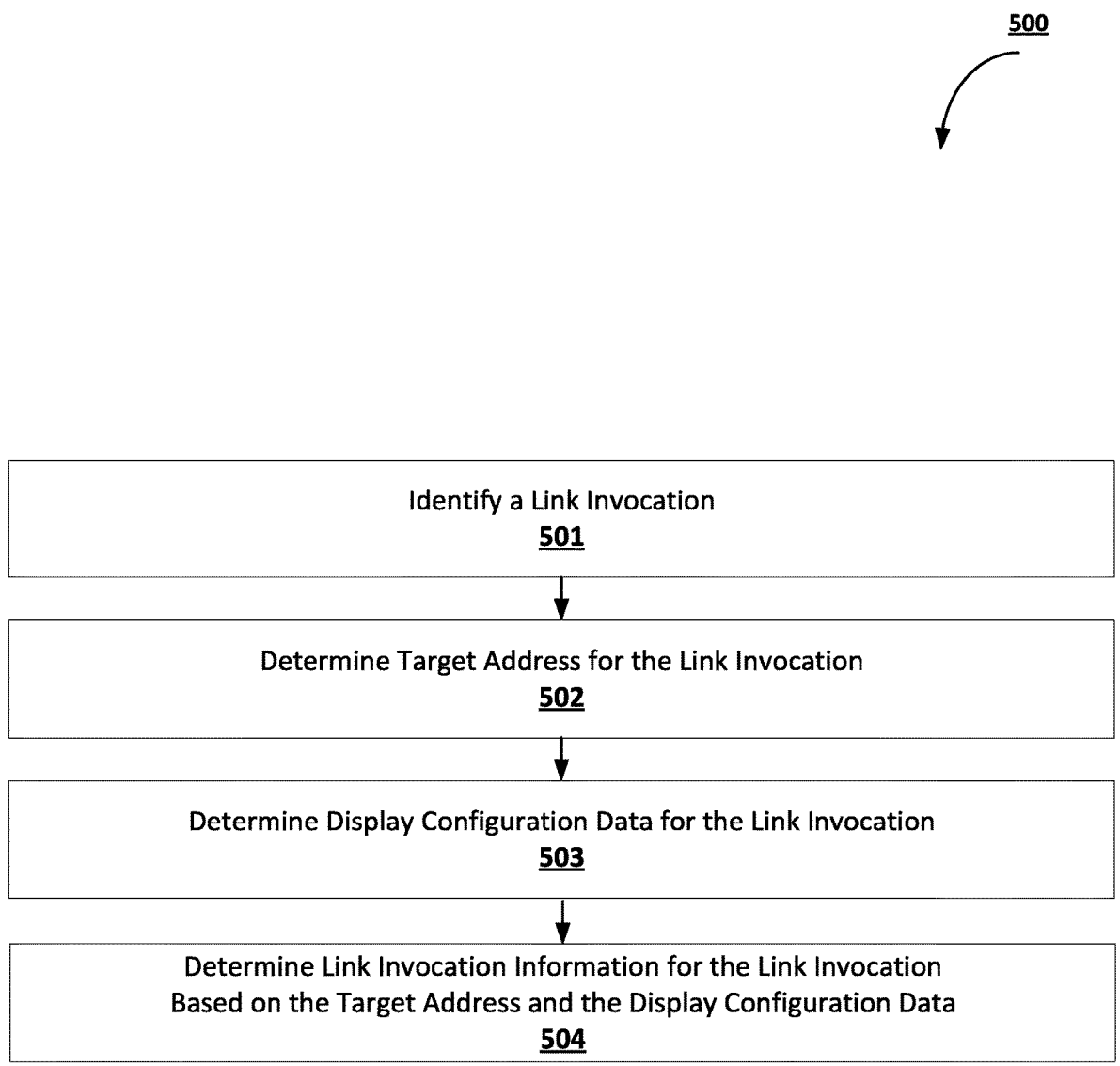

FIG. 5 is a flowchart diagram of an example process for generating link invocation information in accordance with one embodiment of the present invention.

Figure 6:
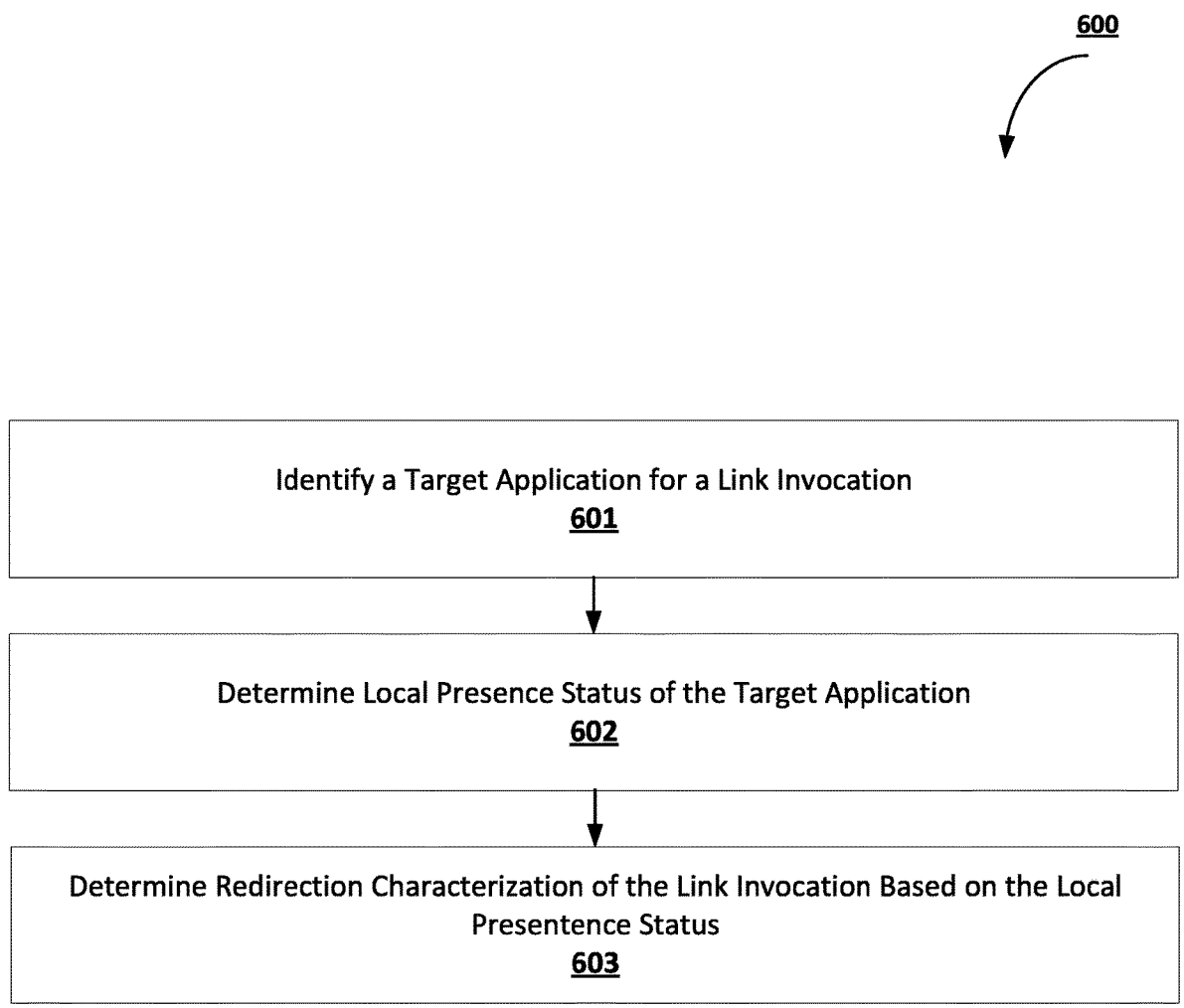

FIG. 6 is a flowchart diagram of an example process for generating a dynamic redirection characterization in accordance with one embodiment of the present invention.

Figure 7:
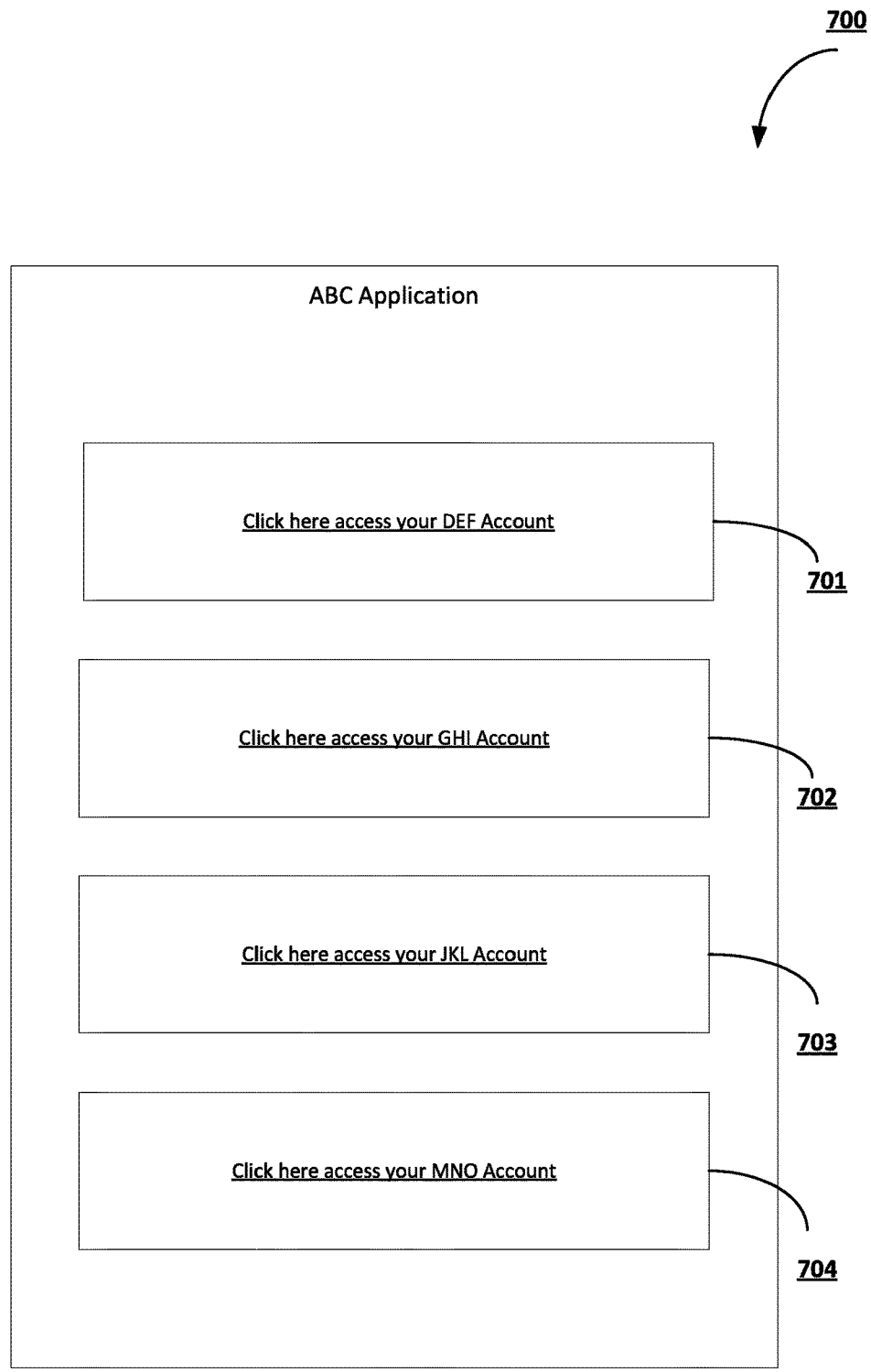

FIG. 7 is an operational example of a client application user interface in accordance with one embodiment of the present invention.

Figure 8:
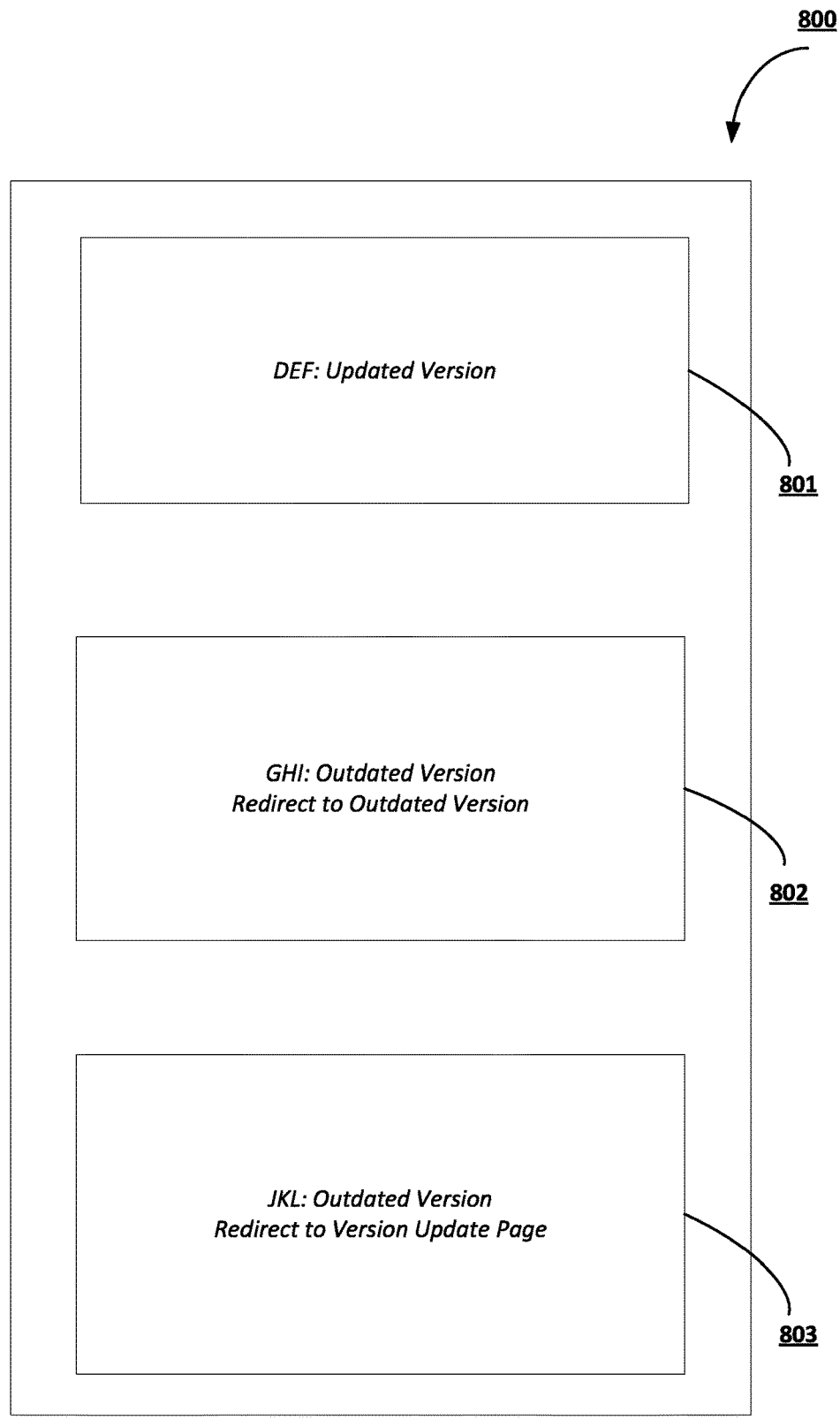

FIG. 8 is an operational example of dynamic redirection configuration data in accordance with one embodiment of the present invention.

Figure 9:
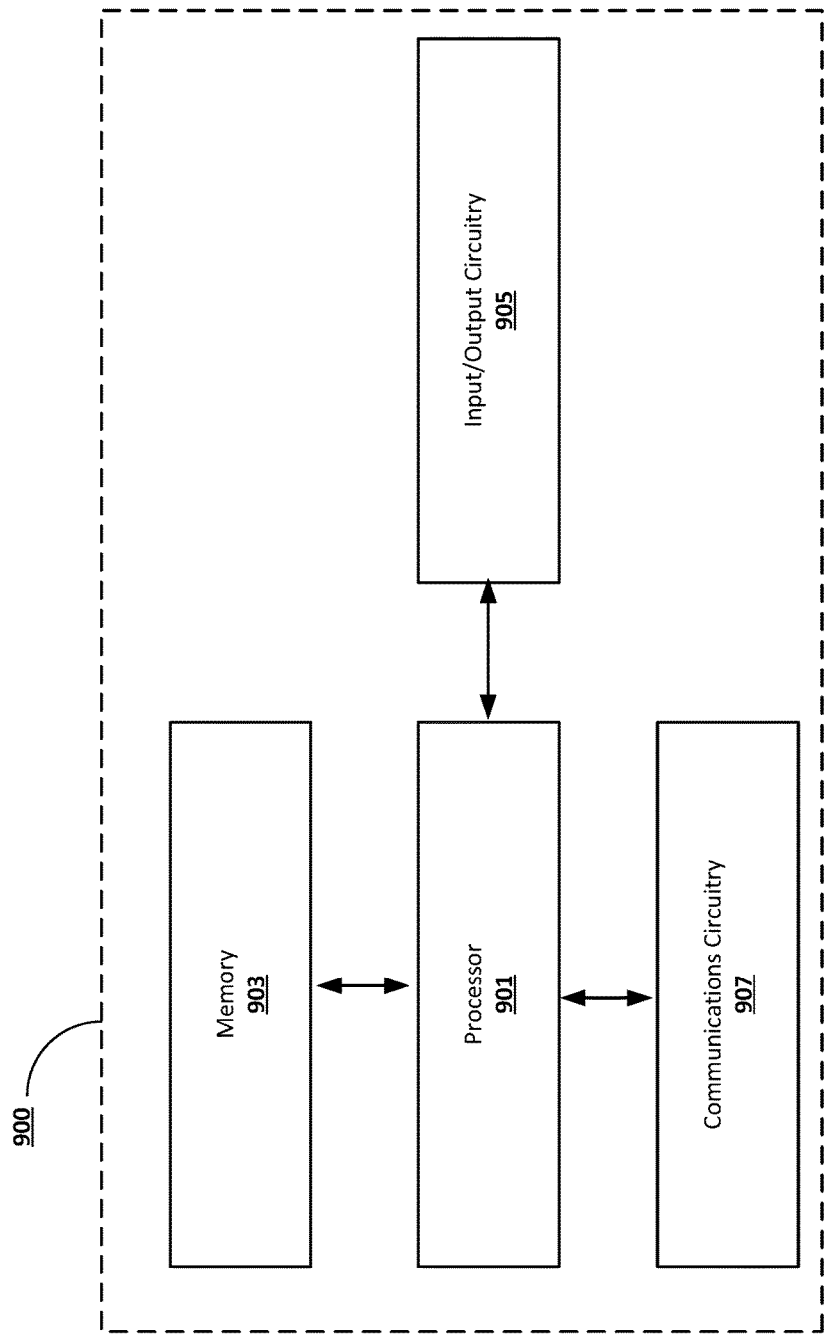

FIG. 9 is a schematic diagram of an example apparatus for a client device in accordance with one embodiment of the present invention.

DETAILED DESCRIPTION OF VARIOUS EMBODIMENTS

Various embodiments of the present invention are described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements.

Overview

Various embodiments of the present invention address technical challenges related to efficiency, reliability and usage adaptability of existing link (e.g., hyperlink, web link, etc.) processing systems. Initially developed as a mechanism to enable webpage developers to conveniently direct users to other webpages, links have evolved to suit far more widespread applications.

Links may be used as a general mechanism to facilitate inter-application communication between various software applications. For example, links may be used for application programming interface (API) calls between various software applications even when such API calls are not associated with any display-oriented content. Such links may be used to establish communication between front-end and back-end services of software applications or as universal identifiers for application resources. This contrasts rather starkly with more traditional link usage whereby activation of links caused an application to load a webpage for display to a user.

Unfortunately, many link processing systems are incapable of reliably and adaptably supporting these disparate link use cases. For example, many link processing systems do not distinguish between webpage loading links and non-webpage links, such as pure API call links. This hampers the ability of software developers to reliably use links for API call purposes without compromising system efficiency by presenting meaningless displays for non-display-oriented link invocations.

As another example, many link processing systems do not distinguish between application invocation links directed to applications that are installed on a computing device and applications that are not installed on a computing device. This makes some links largely useless if the target application is not installed on the invoking computing device, which in turn undermines the reliability of such inter-application links.

As a further example, some link processing systems do not enable applications to modify link processing routines through injecting run-time configuration data into link invocation information associated with those links. This in turn undermines usage adaptability of such link processing systems and in some instances renders such systems largely unreliable for particular applications that require modifications in link processing behavior based on run-time-generated link processing configuration data.

To address the noted technical challenges related to efficiency, reliability and usage adaptability of existing link processing systems, various embodiments of the present invention introduce innovative systems configured for dynamic display characterization and dynamic link redirection. Each of those two system operations contain multiple aspects, and each of those aspects makes significant contributions to efficiency, reliability, and usage adaptability of link processing systems.

For example, at least some aspects of the dynamic display characterization features discussed herein relate to configuring the system to determine whether an expected output of a link invocation is display-oriented, based on link invocation information associated with the link. This may, for example, be performed by processing metadata information about a link generated by a web browser software application. Through this determination, systems configured in accordance with various embodiments of the present invention can distinguish between "web view" links and non-web-view links, such as pure API call links, and are further enabled to enforce different rendering policies with respect to different categories of links. This in turn avoids the efficiency and reliability problems of non-intelligent link processing systems. Application of various embodiments of the invention also improves usage adaptability for link processing systems by enabling intelligent processing of web-view links.

Importantly, the dynamic display characterization may be performed based on link invocation information in addition to and/or instead of a target address for a link, such as based on display configuration information embedded in the Hyper-text Transfer Protocol (HTTP) packets associated with link invocations. Various embodiments of the present invention may enable a link-invoking client application to specify particular parameters that define when a link should be deemed viewable. In some embodiments, this viewable-parameter-definition feature may be utilized by developers and/or users to, for example, enable "blacklisting" frivolous links. In some embodiments, the noted viewable-parameter-definition feature may be utilized by developers and/or users to prevent link invocations from being deemed viewable based on properties related to a time and/or manner of link invocation. For example, the developers and/or users may define parameters that cause link invocations whose invocation intensity (e.g., touch intensity) falls below a threshold intensity to be deemed non-viewable, thus, for example, preventing launch of corresponding webpages for link invocations deemed accidental based on invocation intensity (e.g., where the threshold link intensity may be determined based on past user interaction data and using a trained machine learning model).

While some embodiments of the present invention enable distinguishing between display-oriented links and non-display-oriented links and, thus, contribute to improved efficiency, reliability, and usage adaptability of link processing systems, other embodiments of the present invention go further: they enable definition of custom display configuration data at an application level to allow for overriding conventional link processing routines in order to enable a variety of creative applications of links. In addition, various embodiments of the present invention enable augmenting link invocation information (e.g., HTTP headers) to include display configuration data, such as user-defined display configuration data. Such application-level and/or run-time dynamic link processing capabilities make existing link processing systems more adaptable for creative uses as well as more reliable and more efficient for uses not currently accounted for by link processing systems.

At least some aspects of the dynamic link redirection functions discussed herein relate to determining whether to process a link invocation within an invoking software application by opening an in-app browser page within the invoking software application or instead opening a second software application within the same client device. In some embodiments, the dynamic link redirection functions discussed herein enable selectively redirecting a link to an invoked software application based on whether the invoked software application and/or a sufficiently updated version of the software application is installed on the client device. This avoids redirection of links to non-installed software applications, which in turn prevents efficiency and reliability costs of such mistaken redirections. Moreover, in addition to avoiding redirection of links to non-installed software applications, various embodiments of the present invention enable a modified redirection of a link based on dynamic link configuration data, for example modified redirection of a link to an updated version of a software application to a corresponding page in an outdated version of the software application.

Similar to some aspects of the dynamic display characterization functions, aspects of the dynamic link redirection feature can be modified by users and/or developers at an application-level to allow for unconventional link redirection procedures. For example, various embodiments of the present invention enable "whitelisting" a set of applications that, if they are installed on a computing device, are exclusively designated by the system for resolving links through inter-application redirection. Other links of such specifically configured systems are resolved by inner-application rendering, for example, by displaying content returned in response to those links using in-app browsers.

In some embodiments, developers may use the above noted features to maintain session integrity in a multi-application environment (e.g., a multi-application environment associated with a set of applications owned and/or operated by those developers) without enabling redirection of inter-application redirections to applications outside the multi-application environment. Through enabling such maintenance of session integrity with respect to multi-application environments, various embodiments of the present invention may enhance system efficiency, system reliability, and system security by preventing redirection of users to outside zone of verified security defined by the multi-application environments.

As another example, various embodiments of the present invention enable an invoked software application to change post-link-creation behavior of link invocations through inter-application communications with the invoking software applications that cause the invoking software application to change target addresses for link invocations. Through enabling the above-noted features that allow developers and/or users to affect link redirection procedures by defining user-defined and/or application-level dynamic redirection configuration criteria, various embodiments of the present invention configure link processing systems to be more adaptable for creative uses as well as more reliable and more efficient for uses not currently accounted for by conventional link processing systems.

Definitions

As used herein, The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The terms "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a device is described herein to receive data from another device, it will be appreciated that the data may be received directly from another device or may be received indirectly via one or more intermediary devices, such as, for example, one or more servers, relays, routers, network access points, base stations, hosts, and/or the like (sometimes referred to herein as a "network"). Similarly, where a device is described herein to send data to another device, it will be appreciated that the data may be sent directly to another device or may be sent indirectly via one or more intermediary devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "user" should be understood to refer to an individual, group of individuals, business, organization, and the like. The users referred to herein may access a group-based communication platform using client devices (as defined herein).

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "link invocation" refers to a collection of one or more data items that indicate request for web resources associated with a linked computing resource. For example, the link invocation may be a HTTP packet that is triggered by user engagement with a selected user interface element associated with a link. As another example, the link invocation may be a request for rendering a web page. As yet another example, the link invocation may be an API call (e.g., a representational state transfer (REST) API call), an asynchronous API call such as an Ajax call, etc.).

The term "link invocation information" refers to a collection of one or more data items generated by an invoking software application (e.g., an application device linking engine of the software application) that indicate one or more properties or characteristics of a link invocation. For example, the link invocation information for a link may include one or more target addresses associated with the link invocation, an invocation method (e.g., left-click selection, right-click selection, touch selection, etc.) associated with a link invocation, an invocation intensity (e.g., touch intensity) associated with a link invocation, etc.

The term "link display characterization" refers to a collection of one or more data items generated by a dynamic link processing engine that are configured to indicate if an expected output associated with a link invocation comprises display-oriented data. For example, the link display characterization may be a data item generated by a web browser software application (e.g., Safari) for a link invocation. As another example, the link display characterization may be a data item generated by a link processing software application (e.g., Universal Link).

The term "display-oriented data" refers to any collection of one or more data items that are configured to be displayed or rendered to a user interface. For example, display-oriented data may include data configured to be rendered by a web browser software applications, such as Hyper-Text Markup Language (HTML) data.

The term "dynamic redirection characterization" refers to a collection of one or more data items generated by a dynamic link processing engine that are configured to indicate whether an invoked application associated with a link invocation is installed on a computing device associated with the link invocation. For example, the dynamic redirection characterization may indicate whether the display-oriented data associated with a link invocation is associated an invoked application that is installed on a computing device associated with the link invocation.

The term "local presence status" refers to a collection of one or more data items that are configured to indicate if a software application is installed on a computing device and/or if a sufficiently updated version of a software application is installed on a computing device. In some embodiments, the local presence status of a software application with respect to a computing device may be present (indicating that the software application is installed on the computing device and/or a sufficiently updated version of the software application is installed on the computing device) or absent (indicating that the software application is not installed on the computing device and/or a sufficiently updated version of the software application is not installed on the computing device). In some embodiments, the local presence status of a software application with respect to a computing device may be present (indicating that the software application is installed on the computing device and/or a sufficiently updated version of the software application is installed on the computing device such that redirecting links to the software application requires no link redirection modification), conditionally present (indicating that an insufficiently updated version of the software application is installed on the computing device such that redirecting links to the software application requires some link redirection modification), and absent (indicating that no version of that the software application is installed on the computing device and/or an insufficiently updated version of the software application is installed on the computing device such that redirecting links to the software application is not possible).

The term "inter-application redirection" refers to a group of one or more computer-implemented operations that cause a link invocation in a first software application to lead to displaying of a page associated with a second software application in a user interface of the second application. For example, inter-application redirection between two software applications may cause the first software applications to enter a background operational mode and the second software application to enter an active operational mode.

The term "inner-application rendering" refers to a group of one or more computer-implemented operations that cause a link invocation in a first software application to lead to displaying of a page associated with a second software application and/or a webpage associated with a second software application in a user interface of the first software applications. For example, inner-application rendering may cause the first software application to remain in an active operational model and display a page associated with the second software application in an in-app browser of the software application, e.g., by retrieving a webpage associated with the second software application from a server address associated with the second software application.

The term "display configuration data" refers to a collection of one or more configuration data generated by an invoking software application (e.g., an application device linking engine of the software application) that indicate a link display characterization of a link invocation irrespective of a target application of the link invocation. For example, the display configuration data may include data about manner of link invocation, time of link invocation, etc. The display configuration data for a link invocation may be a part of a HTTP packet for the link invocation, e.g., part of a header for a HTTP packet for the link invocation.

The term "invoking application" refers to a software application within whose user interface a selection corresponding to a link invocation is made. For example, if a user selects a link within the context of a particular application, the particular application may be deemed to be the invoking application for a link invocation that corresponds to the user selection. In some embodiments, the invoking application for a link invocation may be identified by an operating system software application using operating system calls from the software application to the operating system software application.

Example System Architecture for Implementing Embodiments of the Present Invention Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the device may include fixed devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. The architecture 100 comprises a client device 101 that is configured to execute an operating system 110, a dynamic link processing engine 111, and one or more client applications (such as client applications A-N 112A-N). The dynamic link processing engine 111 may be configured to provide various functionalities related to dynamic link processing to the client applications 112, such as various functionalities related to dynamic display characterization and/or various functionalities related to dynamic link redirection. To do so, the dynamic link processing engine 111 may utilize and/or perform at least some of the functionalities of the operating system 110. Therefore, although the exemplary embodiment depicted in FIG. 1 includes the operating system 110 and the dynamic link processing engine 111 as separate software applications, a person of ordinary skill in the art will recognize that some or all of the functionalities of the dynamic link processing engine 111 may in some embodiments be performed by the operating system 110. Moreover, a person of ordinary skill in the art will recognize that, in some embodiments, the operating system 110 and the dynamic link processing engine 111 may be part of the same software application.

The depicted operating system 110 is any software application configured to enable other software applications to access services performed by one or more hardware components associated with the client device 101. For example, the operating system 110 may enable at least one of process management, memory management, file management, input/output management, etc. In some embodiments, the operating system 110 may provide an API characterized by one or more API calls that each enable other software applications to utilize one or more services facilitated by the operating system 110, e.g., one or more hardware-related services facilitated by the operating system 110. In some embodiments, the operating system 110 may provide functionalities for various software applications executing on the client device 101 to communicate with each other, obtain information about each other, and/or utilize the services provided by each other. Examples operating systems 110 include various iPhone OS (iOS) operating systems, various Android operating systems, various Windows operating systems, various Linux operating systems, various Mac OS operating systems, etc.

The depicted dynamic link processing engine 111 is any software application configured to enable various functionalities related to processing of link invocations, such as various dynamic link processing functionalities including various functionalities related to dynamic display characterization and/or various functionalities related to dynamic link redirection, to the client applications 112. For example, the dynamic link processing engine 111 may enable a client application 112 to obtain a link display characterization for a link invocation. As another example, the dynamic link processing engine 111 may enable a client application 112 to obtain a dynamic redirection characterization for a link invocation. As yet another example, the dynamic link processing engine 111 may enable a client application 112 to obtain dynamic redirection configuration data for a link invocation.

The depicted dynamic link processing engine 111 includes a display characterization sub-engine 111A and a dynamic redirection sub-engine 111B. The depicted display characterization sub-engine 111A is configured to provide a link display characterization for a link invocation. To generate a link display characterization for a link invocation, the display characterization sub-engine 111A may utilize functionalities provided by the operating system 110 and/or a link display software application (not depicted) such as web browser software application. The display characterization sub-engine 111A may also utilize display configuration data associated with a link invocation, for example display configuration data included in a header of a HTTP header associated with a link invocation, to generate a link display characterization for the link invocation.

The depicted dynamic redirection sub-engine 111B is configured to provide a dynamic redirection characterization and/or dynamic redirection configuration data for a link invocation. To generate a dynamic redirection characterization and/or dynamic redirection configuration data for a link invocation, the dynamic redirection sub-engine 111B may utilize functionalities provided by the operating system 110. For example, the dynamic redirection sub-engine 111B may utilize functionalities provided by the operating system 110 to communicate with one or more software applications executing on the client device 101. As another example, the dynamic redirection sub-engine 111B may utilize functionalities provided by the operating system 110 to obtain information about one or more software applications executing on the client device 101. In some embodiments, the dynamic redirection sub-engine 111B may generate a dynamic redirection characterization and/or dynamic redirection configuration data for a link invocation by communicating with one or more software applications executing on the client device 101 and/or by obtaining information about one or more software applications executing on the client device 101. In some of those embodiments, to communicate with the one or more software application and/or to obtain information about the one or more software applications, the dynamic redirection sub-engine 111B may communicate with one or more storage software applications (not depicted) executing on the client device 101 and/or with a server device (not depicted).

The client applications 112 may include one or more dynamically-linked client applications, such as client application A 112A and client Application B 112B, and one or more statistically-linked client applications, such as client application C 112C and client application N 112D. Each dynamically-linked client application may include an application dynamic linking engine (e.g., application dynamic linking engine A 122A for the client application A 112A and the application dynamic linking engine B 112B for the client application B 122B), which is a software component that enables the associated client application to communicate with the dynamic link processing engine 111 to utilize at least one of the various functionalities related to dynamic link processing, such as at least one of the various functionalities related to dynamic display characterization and the various functionalities related to dynamic link redirection. In some embodiments, a statistically-linked client application may not include an application dynamic linking engine and/or may fail to enable communicating with the dynamic link processing engine 111 to utilize any of the various functionalities related to dynamic link processing, such as any of the various functionalities related to dynamic display characterization and the various functionalities related to dynamic link redirection.

For example, an application dynamic linking engine may enable an associated software application to request and obtain, from the display characterization sub-engine 111A of the dynamic link processing engine 111, a link display characterization for a link invocation. As another example, an application dynamic linking engine may enable an associated software application to request and obtain, from the dynamic redirection sub-engine 111B of the dynamic link processing engine 111, a dynamic redirection characterization for a link invocation. As yet another example, an application dynamic linking engine may enable an associated software application to request and obtain, from the dynamic redirection sub-engine 111B of the dynamic link processing engine 111, dynamic redirection configuration data for a link invocation.

An example architecture for a client device 101 is depicted in the apparatus 900 of FIG. 12. As depicted in FIG. 12, the apparatus 900 includes processor 901, memory 903, input/output circuitry 905, and communications circuitry 907. Although these components 901-907 are described with respect to functional limitations, it should be understood that the particular implementations necessarily include the use of particular hardware. It should also be understood that certain of these components 901-907 may include similar or common hardware. For example, two sets of circuitries may both leverage use of the same processor, network interface, storage medium, or the like to perform their associated functions, such that duplicate hardware is not required for each set of circuitries.

In one embodiment, the processor 901 (and/or co-processor or any other processing circuitry assisting or otherwise associated with the processor) may be in communication with the memory 903 via a bus for passing information among components of the apparatus. The memory 903 is non-transitory and may include, for example, one or more volatile and/or non-volatile memories. In other words, for example, the memory 903 may be an electronic storage device (e.g., a computer-readable storage medium). The memory 903 may be configured to store information, data, content, applications, instructions, or the like for enabling the apparatus 900 to carry out various functions in accordance with example embodiments of the present invention.

The processor 901 may be embodied in a number of different ways and may, for example, include one or more processing devices configured to perform independently. In some preferred and non-limiting embodiments, the processor 901 may include one or more processors configured in tandem via a bus to enable independent execution of instructions, pipelining, and/or multithreading.

In some preferred and non-limiting embodiments, the processor 901 may be configured to execute instructions stored in the memory 903 or otherwise accessible to the processor 901. In some preferred and non-limiting embodiments, the processor 901 may be configured to execute hard-coded functionalities. As such, whether configured by hardware or software methods, or by a combination thereof, the processor 901 may represent an entity (e.g., physically embodied in circuitry) capable of performing operations according to an embodiment of the present invention while configured accordingly. Alternatively, as another example, when the processor 901 is embodied as an executor of software instructions, the instructions may specifically configure the processor 901 to perform the algorithms and/or operations described herein when the instructions are executed.

In one embodiment, the apparatus 900 may include input/output circuitry 905 that may, in turn, be in communication with processor 901 to provide output to the user and, In one embodiment, to receive an indication of a user input. The input/output circuitry 905 may comprise a user interface and may include a display, and may comprise a web user interface, a mobile application, a client device, a kiosk, or the like. In one embodiment, the input/output circuitry 905 may also include a keyboard, a mouse, a joystick, a touch screen, touch areas, soft keys, a microphone, a speaker, or other input/output mechanisms.

The communications circuitry 907 may be any means such as a device or circuitry embodied in either hardware or a combination of hardware and software that is configured to receive and/or transmit data from/to a network and/or any other device, circuitry, or module in communication with the apparatus 900. In this regard, the communications circuitry 907 may include, for example, a network interface for enabling communications with a wired or wireless communication network. For example, the communications circuitry 907 may include one or more network interface cards, antennae, buses, switches, routers, modems, and supporting hardware and/or software, or any other device suitable for enabling communications via a network. Additionally or alternatively, the communications circuitry 907 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 900. In one embodiment, one or more external systems (such as a remote cloud computing and/or data storage system) may also be leveraged to provide at least some of the functionality discussed herein.

The term "circuitry" should be understood broadly to include hardware and, in one embodiment, software for configuring the hardware. With respect to components of each apparatus 900 the term "circuitry" as used herein should therefore be understood to include particular hardware configured to perform the functions associated with the particular circuitry as described herein. For example, in one embodiment, "circuitry" may include processing circuitry, storage media, network interfaces, input/output devices, and the like. In one embodiment, other elements of the apparatus 900 may provide or supplement the functionality of particular circuitry. For example, the processor 901 may provide processing functionality, the memory 903 may provide storage functionality, the communications circuitry 907 may provide network interface functionality, and the like. Similarly, other elements of the apparatus 900 may provide or supplement the functionality of particular circuitry. For example, the processor 901 may provide processing functionality, the memory 903 may provide storage functionality, the communications circuitry 907 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Invention

69. FIG. 2 provides a data flow diagram of an example process 200 for dynamic link processing. The process 200 may be executed by various components of a client device, e.g., various components of the client device 101 of the architecture 100 in FIG. 1, to enable various dynamic link processing functionalities, such as dynamic display characterization and/or dynamic link redirection.

70. As depicted in FIG. 2, the process 200 begins when an application dynamic linking engine 201 (e.g., the application dynamic linking engine A 122A or the application dynamic linking engine B) provides an initial link invocation 211 to a display characterization sub-engine 202 (e.g., the display characterization sub-engine 111A). The initial link invocation 211 may include data associated with invocation of a particular link by a user of a client application associated with the application dynamic linking engine 201 (e.g., client application A 112A for the application dynamic linking engine A 122A or the client application B 112B for the application dynamic linking engine B 122B). For example, the initial link invocation may include one or more of HTTP data associated with a link invocation, a timestamp associated with a link invocation, a user identifier associated with a link invocation, an invocation method (e.g., left-click selection, right-click selection, touch selection, etc.) associated with a link invocation, an invocation intensity (e.g., touch intensity) associated with a link invocation, etc. In some embodiments, the application dynamic linking engine 201 may augment a HTTP packet associated with a link invocation to include metadata associated with the link invocation, such as metadata associated with a time and/or manner of the link invocation, in a portion of the HTTP packet associated with the link invocation, such as part of an HTTP header for the HTTP associated with the link invocation.

71. The process 200 continues when the display characterization sub-engine 202 performs, in response to receiving the initial link invocation 211 from the application dynamic linking engine 201, operations on the initial link invocation 211 to determine a link display characterization 212 for the initial link invocation 211. The display characterization sub-engine may further provide the link display characterization 212 to the application dynamic linking engine 201. The link display characterization 212 for the initial link invocation 211 may include information about whether the initial link invocation 211 is displayable.

72. In some embodiments, to determine the link display characterization 212 for the initial link invocation, the display characterization sub-engine 202 receives particular link invocation information about the link from an operating system 204 (e.g., operating system 110) or to a link display software application, such as a web browser application. For example, the display characterization sub-engine 202 may receive particular link invocation information from a Safari web browser, which is in turn configured to determine the link display characterization 212 (e.g., a web view characterization) for the initial link invocation 211. As another example, the display characterization sub-engine 202 may receive particular link invocation information from a Universal Link component of an iOS operating system, which is in turn configured to determine the link display characterization 212 for the initial link invocation 211. As a further example, the display characterization sub-engine may receive particular link invocation information from a display characterization server device, which is in turn configured to determine the link display characterization 212 for the initial link invocation 211.

73. The process 200 continues when the application dynamic linking engine 201 provides a dynamic redirection data request 213 for the initial link invocation 211 to a dynamic redirection sub-engine 203 (e.g., the dynamic redirection sub-engine 111B). In some embodiments, the application dynamic linking engine 201 provides the dynamic redirection data request 213 for the initial link invocation 211 to the dynamic redirection sub-engine 203 in response to determining that the link display characterization 212 for the initial link invocation 211 indicates that the initial link invocation 211 is displayable. In some embodiments, the dynamic redirection data request 213 for the initial link invocation 211 includes a request for a dynamic redirection data 214 for the initial link invocation 211, such as a request for a dynamic redirection characterization for the initial link invocation 211 and/or a request for dynamic redirection configuration data for the initial link invocation 211. In some embodiments, the dynamic redirection data request 213 for the initial link invocation 211 includes at least some of the link invocation information associated with the initial link invocation 211, such as at least some of the HTTP data associated with the initial link invocation 211.

74. The process 200 continues when the dynamic redirection sub-engine 203 performs, in response to receiving the dynamic redirection data request 213 for the initial link invocation 211 from the application dynamic linking engine 201, operations on the dynamic redirection data request 213 configured to generate the dynamic redirection data 214 associated with the dynamic redirection data request 213. The dynamic redirection data 214 for associated with the dynamic redirection data request 213 may include at least one of dynamic redirection characterization for the initial link invocation 211 and/or for dynamic redirection configuration data for the initial link invocation 211. For example, the dynamic redirection data 214 for a dynamic redirection data request 213 may include information about whether the initial link invocation 211 associated with the dynamic redirection data request 213 is redirectable to any client application executing on the same client device as a client application associated with the initial link invocation 211. As another example, the dynamic redirection data 214 for a dynamic redirection data request 213 may include information about whether at least one property (e.g., a target address) of the initial link invocation 211 associated with the dynamic redirection data request 213 should be modified prior to redirection of the initial link invocation 211.

75. In some embodiments, to determine dynamic redirection data 214, the dynamic redirection sub-engine 203 communicates with at least one of an operating system 204 (e.g., operating system 110), a storage software application, and a dynamic redirection data server device. For example, the dynamic redirection sub-engine 203 may utilize shared inter-application memory functionalities provided by an operating system 204 or by a storage software application (e.g., Dropbox) to communicate with other software applications executing on the same device and obtain information used to determine dynamic redirection data 214 for links targeted towards those software applications. As another example, the dynamic redirection sub-engine 203 may utilize inter-app communication functionalities provided by an operating system 204 to communicate with other software applications executing on the same device and obtain information used to determine dynamic redirection data 214 for links targeted towards those software applications. As yet another example, the dynamic redirection sub-engine 203 may utilize information about which applications are installed on a client device to determine dynamic redirection data 214 for links targeted towards those software applications. As a further example, the dynamic redirection sub-engine 203 may communicate with a dynamic redirection data server device to obtain information about various software applications and use the obtained information to determine dynamic redirection data 214 for links targeted towards those software applications.

76. The process 200 continues when the application dynamic linking engine 201 receives the dynamic redirection data 214, generates a processed link invocation 215 based on the dynamic redirection data 214 and the initial link invocation 211, and provides the processed link invocation 215 to the operating system 204. In some embodiments, to generate the processed link invocation 215, the application dynamic linking engine 201 modifies a target address of the initial link invocation 211 in accordance with the dynamic redirection configuration data in the dynamic redirection data 214 if the dynamic redirection characterization in the dynamic redirection data 214 indicates that the initial link invocation 211 is redirectable. In some embodiments, if the if the dynamic redirection characterization in the dynamic redirection data 214 indicates that the initial link invocation 211 is not redirectable, the application dynamic linking engine 201 does not modify the target address of initial link invocation 211 and/or generates a processed link invocation 215 that is substantially the same as the initial link invocation 211.

77. FIG. 3 is a distributed flowchart diagram of an example process for link processing. The process 300 may be performed by various components of a client device, e.g., the client device 101 of the architecture 100 in FIG. 1, to enable either or both of dynamic link processing and non-dynamic link processing. In some embodiments, the process 300 may be performed to process non-viewable and/or non-redirectable links, as further discussed below. However, the process 300 may also be performed in some embodiments to enable various dynamic link processing functionalities, such as dynamic display characterization and/or dynamic link redirection.

78. The process 300 begins at block 301 when a client application 351 receives a link invocation indication and transmits the link invocation indication to an application dynamic linking engine 352 associated with the client application 351. For example, the client application 351 may receive an indication of a user actions configured to invoke a particular link. The client application 351 may then combine information associated with the link invocation, e.g., a target address of the link invocation, a manner of link invocation, an intensity of link invocation, a time of link invocation, a user identifier of an invoking user, etc., to generate the link invocation indication. In some embodiments, the client application 351 is a dynamically-linked client application.

79. At block 302, the application dynamic linking engine 352 determines relevant link invocation information from the link invocation indication and transmits the relevant link invocation information to a display characterization sub-engine 353. For example, the application dynamic linking engine 352 may combine some of the information entries associated with the link invocation indication into an HTTP packet and transmit the HTTP packet to the display characterization sub-engine 353. In some embodiments, the display characterization sub-engine 353 includes at least some of the information not associated with a target address of the link invocation into a header of an HTTP packet associated with the link invocation. Thus, in some embodiments, the application dynamic linking engine 352 augments the header of an HTTP packet associated with a link invocation to include additional invocation information in addition information required by various portions of an HTTP packet.

80. At block 303, the display characterization sub-engine 353 determines a link display characterization for the link in response to receiving the relevant link invocation information from the application dynamic linking engine 352, and transmits the link display characterization to the application dynamic linking engine 352. Then, at block 304, the application dynamic linking engine 352 determines, based on the received link display characterization, whether the link is displayable (e.g., is a web view link). If the application dynamic linking engine 352 determines that the link is not displayable (e.g., includes an API call without a displayable output such as a hyper-text markup language (HTML) output), the application dynamic linking engine 352 requests that an operating system 355 performs the web request processing for the link without utilizing any web browsing or inter-application redirection, which the operating system 355 performs at block 305.

81. At block 306, if the application dynamic linking engine 352 determines that the link is displayable, the application dynamic linking engine 352 generates a dynamic redirection data request for the link and transmits the dynamic redirection data request to a dynamic redirection sub-engine 354. At block 307, the dynamic redirection sub-engine 354 generates dynamic redirection data in response to the dynamic redirection data request and transmits the generated dynamic redirection data to the application dynamic linking engine 352. The dynamic redirection data may include a dynamic redirection characterization for the link and dynamic redirection configuration data for the link. The dynamic redirection characterization for the link may include an indication of whether the link should be redirected to another application on the client device instead of being rendered through a web browser. The dynamic redirection configuration data may include information about which page of a target application should a link be redirected to.

82. At block 307, the application dynamic linking engine 352 determines whether the link is redirectable based on the dynamic redirection characterization for the link in the received dynamic redirection data for the link. If the application dynamic linking engine 352 determines that the link is redirectable based on the dynamic redirection characterization for the link, the application dynamic linking engine 352 requests that the operating system 355 renders a display corresponding to the output of the link in a web browser, which the operating system 355 performs at block 308. However, if the application dynamic linking engine 352 determines that the link is not redirectable, the application dynamic linking engine 352 generates (at block 309) a processed link invocation based on the dynamic redirection configuration data for the link and provides (at block 310) the processed link invocation to the operating system 355 for inter-application redirection to the operating system 355, which the operating system 355 performs at block 311.

83. FIG. 4 provides a flow chart diagram of an example process 400 for dynamic link processing. The process 400 may be executed by a system of one or more computers associated with a client device, e.g., the client device 101 of the architecture 100 in FIG. 1, to enable various dynamic link processing functionalities, such as dynamic display characterization and/or dynamic link redirection.

84. The process 400 begins at block 401 when the system obtains a link invocation at a first client application operating on a client device. For example, the system may obtain an indication of a user action configured to invoke a particular link. As another example, the system may receive an API call configured to invoke a particular link.

85. At block 402, the system determines link invocation information for the link invocation. In some embodiments, link invocation information for a link invocation may include any information items that relate to whether a link invocation is displayable and/or redirectable. For example, the link invocation information may include a target address of the link invocation, which may contribute to determining whether the link is displayable and redirectable. However, other link invocation information may also be provided in addition to and/or instead of the target address. For example, some link display software applications may include plugin applications that are configured to recognize that particular link invocations having particular data patterns in the HTTP packets associated with those particular link invocations are displayable. In those embodiments, determining link invocation information for such link invocations may include determining information pertaining to the noted particular data patterns.

86. In some embodiments, operations pertaining to block 402 may be performed in accordance with the process 500 depicted in FIG. 5. As depicted in FIG. 5, the process 500 begins at block 501 when the system identifies a link invocation. At block 502, the system determines a target address for the link invocation. At block 503, the system determines display configuration data for the link invocation. The display configuration data for the link invocation may include a combination of one or more data values associated with a link invocation (e.g., one or more data values in the header of an HTTP request associated with the link invocation) whose presence indicates the displayable status of the link invocation irrespective of the target address for the link invocation. At block 504, the system determines the link invocation information for the link invocation based on the target address for the link invocation determined in block 502 and the display configuration data for the link invocation determined in block 503. In some embodiments, the link invocation information for the link information include an HTTP packet associated with the link invocation. In some of those embodiments, at least some of the display configuration data for the link invocation are provided in the header of the HTTP packet associated with the link invocation.

87. Returning to FIG. 4, at block 403, the system determines a link display characterization for the link invocation. In some embodiments, the system utilizes one or more operating system functionalities and/or one or web browser functionalities to determine the link display characterization for the link invocation. For example, the system may provide the link invocation information (e.g., an HTTP packet associated with the link invocation) to a web browser application (e.g., the Safari application). In response, the web browser application may provide information about whether the link displayable. In some embodiments, to determine whether the link is displayable, the web browser application may request an action requested by the link invocation and analyze the output of the request to determine whether those results are displayable (e.g., whether those results include HTML code).

88. In some embodiments, to determine the link display characterization for the link invocation, the system provides particular link invocation information about the link to an operating system or to a link display software application, such as a web browser application. For example, the system provide particular link invocation information to a Safari web browser, which is in turn configured to determine the link display characterization. As another example, the system may provide particular link invocation information to a Universal Link component of an iOS operating system, which is in turn configured to determine the link display characterization. As a further example, the system may provide particular link invocation information to a display characterization server device, which is in turn configured to determine the link display characterization.

89. At block 404, the system determines dynamic redirection data for the link invocation based on the link invocation information for the link invocation. The dynamic redirection data for the link invocation may include the dynamic redirection characterization for the link invocation and the dynamic redirection configuration data for the link invocation. The dynamic redirection characterization for the link invocation may indicate whether the link is redirectable, e.g., whether processing the link invocation should including directing the user to another software application on the client device. For example, if a target application for the link invocation is not installed on the client device, the dynamic redirection characterization for the link invocation may indicate that the link is not redirectable. As another example, if the latest version of the target application for the link invocation is not installed on the client, the dynamic redirection characterization for the link invocation may indicate that the link is conditionally redirectable, e.g., subject to any redirection modifications noted in the dynamic redirection configuration data for the link invocation.

90. In some embodiments, operations pertaining to block 404 include generating a dynamic redirection characterization for the link invocation. In some embodiments, generating a dynamic redirection characterization for the link invocation may be performed in accordance with the operations of the process 600 depicted in FIG. 6. As depicted in FIG. 6, the process 600 begins at block 601 when the system identifies, based on the target address for the link invocation, a target application for the link invocation. For example, the system may analyze a target address for the link invocation based on address-application correlation data (e.g., Universal Link data in some iOS systems) to determine which particular client application associated with the system relate to the target address. The system may then determine that particular client application is the target applications.

91. At block 602, the system determines a local presence status for the target application. The local presence status for the target application may indicate whether an acceptable version of the target application is installed on the client device. In some embodiments, if an acceptable version of the target application is installed on the client device, the system may determine a present status for the target application. In some embodiments, if no version of the target application is installed on the client application and/or if an unacceptable version of the target application is installed on the client device, the system may determine an absent status for the target application. In some embodiments, if the system determines that an outdated version of the target application is installed on the client application for which there is available dynamic redirection configuration data, the system may determine a conditionally present status for the target application. In some embodiments, if the system determines that an outdated version of the target application is installed on the client application for which there is no available dynamic redirection configuration data, the system may determine an absent status for the target application.

92. In some embodiments (e.g., some embodiments utilizing an iOS operating system), the target application may be configured to (if installed on the client device) write to a particular memory location noting that it installed on the client device (and, in some embodiments, its latest version). The system may retrieve the noted application-supplied information from the particular memory location and utilize that information to determine the local presence status of the target location. The particular memory location may be a memory location allocated by an operating system and/or by a third-party storage application (e.g., Dropbox). In some embodiments, the target application may be configured to (if installed on the client device) transmit information to a server device noting that it installed on the client device (and, in some embodiments, its latest version). The system may retrieve the noted application-supplied information from the particular memory location and utilize that information to determine the local presence status of the target application. In some embodiments (e.g., some embodiments utilizing an Android operating system), the target application may utilize data provided by the operating system about application installed on the client device and/or latest versions of application installed on the client device to determine local presence status of the target application.

93. At block 603, the system determines a dynamic redirection characterization for the link invocation based on the local presence status for the link invocation. In some embodiments, if the local presence status for the link invocation indicates a present status, the system may determine an unmodified dynamic redirection characterization for the link invocation. In some embodiments, if the local presence status for the link invocation indicates a conditionally present status, the system may determine a modified dynamic redirection characterization associated with the dynamic redirection configuration data associated with the target application. In some embodiments, if the local presence status for the link indicates an absent status, the system may determine a non-redirection characterization.

94. Returning to FIG. 4, at block 405, the system determines whether link invocation is both displayable and redirectable. If the system determines that the link invocation is displayable and redirectable, at block 411, the system performs inter-application redirection for the link invocation, e.g., by opening a particular page in a particular client application on the client device in response to the link invocation. If the system determines that link invocation is not both displayable and redirectable, the system performs non-redirective processing for the link. In some embodiments, if the system determines that the link invocation is not viewable, the system performs an operation requested by the link invocation without opening a browser page. In some embodiments, if the system determines that the link invocation is viewable but not redirectable, the system opens a browser page to display an output corresponding to the link invocation.

95. In some embodiments, aspects of the dynamic link redirection discussed above in relations to FIGS. 2-6 are depicted in the operational examples of FIGS. 7-8. FIG. 7 depicts a user interface 700 for a client application (i.e., the ABC application) with four links: link 701 to the DEF application, link 702 to the GHI application, link 703 to the JKL application, and link 704 to the MNO application.

96. FIG. 8 depicts dynamic redirection data 800 for a client device that includes the ABC applications. As depicted in FIG. 8, the dynamic redirection data entry 801 notes the latest version of the DEF application is installed on the client device. This may cause the system to (e.g., in response to an invocation of link 701) determine a present local presence status for the DEF application. In addition, the dynamic redirection data entry 802 notes that the GHI application has an outdated version installed on the client device and further notes that all links to the GHI application should go to the outdated version nevertheless. This also may cause the system to (e.g., in response to an invocation of link 702) determine a present local presence status for the GHI application, because no redirection modification is required despite the outdated status of the version of the GHI application installed on the client device. Furthermore, the dynamic redirection data entry 803 notes that the JKL application has an outdated version installed on the client device and further notes that all links to the JKL application should go to a version update page. This may cause the system to (e.g., in response of an invocation of the link 703) determine a conditionally present local presence status for the JKL application, because while redirection of links targeting the JKL application is permitted, a modification of such redirections is needed because of the outdated status of the version of the GHI application installed on the client device. Moreover, there is no dynamic redirection data entry in the dynamic redirection data 800 for the MNO applications, which may cause the system to (e.g., in response to an invocation of the link 704) determine an absent local presence status for the MNO and do not permit redirections of the links targeting the MNO application.

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for performing dynamic link processing for a link invocation received via an invoking application of one or more software applications of a computing device, the computer-implemented method comprising:
    determining link invocation information associated with the link invocation, wherein the link invocation information comprises an invoked application identifier associated with an invoked application for the link invocation;
    determining, based on the link invocation information, a link display characterization for the link invocation, wherein the link display characterization for the link invocation indicates if an expected output associated with the link invocation comprises display-oriented data for rendering in a user interface; and
    in response to determining that the link display characterization indicates that the expected output associated with the link invocation comprises the display-oriented data:
        determining, based on the link invocation information, a dynamic redirection characterization for the link invocation, wherein the dynamic redirection characterization for the link invocation indicates if the display-oriented data associated with the link invocation is associated with a target application of the one or more software applications that are installed in the computing device, wherein determining the dynamic redirection characterization for the link invocation further comprises:
            determining a local presence status for the invoked application, wherein the local presence status indicates whether the invoked application is installed on the computing device, and
            determining the dynamic redirection characterization based on the local presence status; and
        in response to determining that the dynamic redirection characterization indicates that the display-oriented data associated with the link invocation is associated with the target application of the one or more software applications that are installed in the computing device, performing an inter-application redirection between the invoking application and the target application.

2. The computer-implemented method of claim 1, wherein:
    receiving the local presence status for the invoked application comprises retrieving dynamic redirection data stored in an inter-application shared storage medium;
    each of the one or more software applications are configured to write local presence data for a corresponding software application to the inter-application shared storage medium; and
    the dynamic redirection data includes the local presence data for each software application of the one or more software applications.

3. The computer-implemented method of claim 1, wherein determining the local presence status for the invoked application comprises retrieving local presence data for the one or more software applications from an operating system software application associated with the computing device.

4. The computer-implemented method of claim 1, wherein determining the local presence status for the invoked application comprises determining a present local presence status in response to determining the invoked application is one of the one or more software applications.

5. The computer-implemented method of claim 1, further comprising determining a present local presence status in response to determining a latest version of the invoked application is one of the one or more software applications.

6. The computer-implemented method of claim 1, wherein determining the dynamic redirection characterization based on the local presence status comprises determining that the display-oriented data associated with the link invocation is associated with the target application in response to determining that the local presence status indicates a present local presence status.

7. The computer-implemented method of claim 1, wherein:
    the link invocation information associated with the link invocation comprises a target address for the link invocation; and
    determining the link display characterization comprises determining if the target address comprises the display-oriented data.

8. The computer-implemented method of claim 1, wherein the display-oriented data comprises hyper-text markup language (HTML) data.

9. The computer-implemented method of claim 1, wherein:
the link invocation information associated with the link invocation comprises display configuration data for the link invocation, wherein the display configuration data indicates the link display characterization of the link invocation irrespective of a target address of the link invocation; and
determining the link display characterization comprises determining the link display characterization of the link invocation based on the display configuration data.

10. The computer-implemented method of claim 9, further comprising augmenting a Hyper-text Transfer Protocol (HTTP) packet header associated with the link invocation to comprise at least a portion of the display configuration data for the link invocation.

11. The computer-implemented method of claim 1, further comprising:
in response to determining that the dynamic redirection characterization indicates that the display-oriented data associated with the link invocation is not associated with the target application, performing an inner-application rendering of the target application within an in-app browser associated with the invoking application.

12. The computer-implemented method of claim 1, wherein:
the link invocation information associated with the link invocation comprises a link invocation intensity; and
determining the link display characterization comprises determining that the dynamic redirection characterization indicates that the expected output associated with the link invocation does not comprise the display-oriented data in response to determining that the link invocation intensity fails to satisfy an intensity threshold.

13. An apparatus configured to perform dynamic link processing for a link invocation received via an invoking application of one or more software applications of a computing device, the apparatus comprising at least one processor and at least one non-transitory memory comprising program code, wherein the at least one non-transitory memory and the program code are configured to, with the at least one processor, cause the apparatus to:
determine link invocation information associated with the link invocation, wherein the link invocation information comprises an invoked application identifier associated with an invoked application for the link invocation; and
determine, based on the link invocation information, a link display characterization for the link invocation, wherein the link display characterization for the link invocation indicates if an expected output associated with the link invocation comprises display-oriented data for rendering in a user interface;
wherein the at least one non-transitory memory and the program code are configured to, with the at least one processor, cause the apparatus to, in response to determining that the link display characterization indicates that the expected output associated with the link invocation comprises the display-oriented data:
determine, based on the link invocation information, a dynamic redirection characterization for the link invocation, wherein the dynamic redirection characterization for the link invocation indicates if the display-oriented data associated with the link invocation is associated with a target application of the one or more software applications that are installed in the computing device, wherein the at least one non-transitory memory and the program code are configured to, with the at least one processor, cause the apparatus to:
receive a local presence status for the invoked application, wherein the local presence status indicates whether the invoked application is installed on the computing device, and
determine the dynamic redirection characterization based on the local presence status; and
wherein the at least one non-transitory memory and the program code are configured to, with the at least one processor, cause the apparatus to, in response to determining that the dynamic redirection characterization indicates that the display-oriented data associated with the link invocation is associated with the target application of the one or more software applications that are installed in the computing device, perform an inter-application redirection between the invoking application and the target application.

14. The apparatus of claim 13, wherein the at least one non-transitory memory and the program code are configured to, with the at least one processor, cause the apparatus to:
receive the local presence status for the invoked application comprises retrieving dynamic redirection data stored in an inter-application shared storage medium;
wherein each of the one or more software applications are configured to write local presence data for a corresponding software application to the inter-application shared storage medium; and
wherein the dynamic redirection data includes the local presence data for each software application of the one or more software applications.

15. The apparatus of claim 13, wherein, when determining the local presence status for the invoked application, the at least one non-transitory memory and the program code are configured to, with the at least one processor, cause the apparatus to retrieve local presence data for the one or more software applications from an operating system software application associated with the computing device.

16. The apparatus of claim 13, wherein, when determining the local presence status for the invoked application, the at least one non-transitory memory and the program code are configured to, with the at least one processor, cause the apparatus to determine a present local presence status in response to determining the invoked application is one of the one or more software applications.

17. The apparatus of claim 13, wherein, when determining the local presence status for the invoked application, the at least one non-transitory memory and the program code are configured to, with the at least one processor, cause the apparatus to determine a present local presence status in response to determining a latest version of the invoked application is one of the one or more software applications.

18. The apparatus of claim 13, wherein the at least one non-transitory memory and the program code are configured to, with the at least one processor, cause the apparatus to:
in response to determining that the target application is not installed on the computing device, perform an inner-application rendering of the target application within an in-app browser associated with the invoking application.

19. A non-transitory computer storage medium for performing dynamic link processing for a link invocation received via an invoking application of one or more software applications of a computing device, wherein the non-transitory computer storage medium comprises instructions configured to cause one or more processors to:

determine link invocation information associated with the link invocation, wherein the link invocation information comprises an invoked application identifier associated with an invoked application for the link invocation; and determine, based on the link invocation information, a link display characterization for the link invocation, wherein the link display characterization for the link invocation indicates if an expected output associated with the link invocation comprises display-oriented data for rendering in a user interface;

wherein the non-transitory computer storage medium comprises the instructions configured to cause the one or more processors to, in response to determining that the link display characterization indicates that the expected output associated with the link invocation comprises the display-oriented data:

determine, based on the link invocation information, a dynamic redirection characterization for the link invocation, wherein the dynamic redirection characterization for the link invocation indicates if the display-oriented data associated with the link invocation is associated with a target application of the one or more software applications that are installed in the computing device, wherein the non-transitory computer storage medium comprises the instructions configured to cause the one or more processors to:

determine a local presence status for the invoked application, wherein the local presence status indicates whether the invoked application is installed on the computing device, and determine the dynamic redirection characterization based on the local presence status; and wherein the non-transitory computer storage medium comprises the instructions configured to cause the one or more processors to, in response to determining that the dynamic redirection characterization indicates that the display-oriented data associated with the link invocation is associated with the target application of the one or more software applications that are installed in the computing device, perform an inter-application redirection between the invoking application and the target application.

* * * * *